United States Patent
Curtis et al.

(10) Patent No.: US 8,085,799 B2
(45) Date of Patent: Dec. 27, 2011

(54) SYSTEM, METHOD AND PROGRAM FOR NETWORK ROUTING

(75) Inventors: Richard Scott Curtis, Parker, CO (US); Jason Davis Forrester, Thornton, CO (US)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 11/765,099

(22) Filed: Jun. 19, 2007

(65) Prior Publication Data
US 2008/0317056 A1 Dec. 25, 2008

(51) Int. Cl.
*H04L 12/56* (2006.01)
(52) U.S. Cl. .................. 370/409; 370/350; 370/351
(58) Field of Classification Search ............... 370/409, 370/351, 395.21
See application file for complete search history.

(56) References Cited

U.S. PATENT DOCUMENTS

| | | | | |
|---|---|---|---|---|
| 4,656,658 | A | | 4/1987 | King |
| 5,287,384 | A | * | 2/1994 | Avery et al. ................ 375/134 |
| 5,452,294 | A | * | 9/1995 | Natarajan .................... 370/351 |
| 6,327,364 | B1 | * | 12/2001 | Shaffer et al. ........... 379/265.02 |
| 6,563,788 | B1 | | 5/2003 | Torba et al. |
| 6,633,542 | B1 | | 10/2003 | Natanson et al. |
| 6,728,779 | B1 | | 4/2004 | Griffin et al. |
| 6,732,156 | B2 | | 5/2004 | Miloslavsky |
| 6,928,061 | B1 | * | 8/2005 | Garcia-Luna-Aceves et al. ............................ 370/329 |
| 7,512,079 | B2 | * | 3/2009 | Labrador et al. ............. 370/254 |
| 7,519,385 | B2 | * | 4/2009 | Nguyen ........................ 455/522 |
| 2004/0032831 | A1 | * | 2/2004 | Matthews .................... 370/238 |
| 2004/0170158 | A1 | | 9/2004 | Man-Hak Tso et al. |
| 2005/0111352 | A1 | * | 5/2005 | Ho et al. ...................... 370/219 |
| 2006/0198298 | A1 | * | 9/2006 | Bhogavilli et al. ........... 370/229 |
| 2007/0070931 | A1 | * | 3/2007 | Lewis et al. .................. 370/328 |
| 2008/0170510 | A1 | * | 7/2008 | Singh ........................... 370/254 |

FOREIGN PATENT DOCUMENTS

| | | | |
|---|---|---|---|
| EP | 06251138 | * | 3/2006 |
| WO | WO2006/006117 | * | 1/2006 |

OTHER PUBLICATIONS

"BGP Flap Dampening" presentation, ISP/IXP Workshop, 2000 Cisco System, pp. 1-8.

* cited by examiner

*Primary Examiner* — Dang Ton
*Assistant Examiner* — Pamit Kaur
(74) *Attorney, Agent, or Firm* — Schmeiser, Olsen & Watts; Arthur J. Samodovitz

(57) ABSTRACT

Computer system, method and program for making routing decisions. A best routing path according to an OSPF, IGRP, EIGRP, BGP or other routing function that can provide multiple routing paths is determined. A first multiplicity of routers in the best routing path is determined. If each of the first multiplicity of routers had a degree of availability and/or quality of signal during a predetermined prior interval that met predetermined respective thresholds, the message packet is forwarded to a next hop in the best routing path. If not, a second multiplicity of routers in a second best routing path determined according to said OSPF, IGRP, EIGRP, BGP or the other routing function is identified. If each of the second multiplicity of routers had a degree of availability and/or quality of signal during a predetermined prior interval that met respective thresholds, the message packet is forwarded to a next hop in the second best routing path.

17 Claims, 3 Drawing Sheets

SYSTEM, METHOD AND PROGRAM FOR NETWORK ROUTING

FIELD OF THE INVENTION

The present invention relates generally to network routing, and more specifically to routing decision technology.

BACKGROUND OF THE INVENTION

Computer networks such as the Internet are well known today. Such networks include communication media, firewalls, routers, network switches and hubs. (Typically, firewalls, network switches and hubs includes routers.) Networks often interconnect client computers and servers to each other. In the case of communications through the Internet, typically there are many routers and many possible routing paths between a source computer and a destination device (for example, a destination computer or gateway to a subnet) via the Internet. When a message arrives at a router, the router makes a decision as to the next router or "hop" in a path to the destination device. There are many known algorithms for making this decision, such as Open Shorted Path First (OSPF), Interior Gateway Routing Protocol (IGRP), Enhanced Interior Gateway Routing Protocol (EIGRP), Intermediate System to Intermediate System (ISIS), or Border Gateway Protocol (BGP). The RIP, OSPF and ISIS protocols attempt to route message packets to a destination via the shortest path, i.e. fewest number of intervening routers. Routers using the OSPF protocol also can determine the bandwidth of the path to the next hop based on the interface used for forwarding the message packet to the next hop. The IGRP and EIGRP protocols attempt to route message packets based on greatest bandwidth, shortest delays and shortest path factors. The BGP protocol attempts to route message packets based on shortest Autonomous System path (i.e. fewest number of routers within a single administrative control), least multi-exit discriminator ("MED") (i.e. a preference for one route over another that is advertised to neighboring routers, etc.). The OSPF, IGRP, EIGRP and BGP routing functions identify and record more than one route to most destination devices, and attempt to utilize them in order of their respective routing policy.

Occasionally, a router fails or the communication link to the router fails. Also, for wireless connections, a router may experience a high noise level or weak signal strength under certain conditions, such as long distance from a broadcast location or intervening terrain. Consequently, a router may become unavailable after its last broadcast of availability, or become unavailable after partial download of a lengthy message (such as a lengthy file). Also, a router with very high noise level or weak signal strength may be unable to accurately receive message packets.

A prior art BGP protocol has a "Dampening" function which tracks whether a preferred path or "route" to a corresponding IP address has frequently been updated. This occurs when (a) some of routers in the path have changed, (b) some of the interfaces (such as Ethernet, Fibre, T1 or OC3 dedicated line) of routers in the path have changed, or (c) an administrator has made changes to the configuration (such as length of path through router), applies a routing policy, or filters routes of routers in the route. Every time there is such a change to the "route" to a destination IP address, then every router participating in the BGP instance and other routers to which they have broadcast, etc. rebroadcast the route to this destination IP address. If there are more than a threshold number of changes to the route within a predetermined interval, then the BGP Dampening function removes the route altogether from its routing tables. Consequently, if the router with this BGP Dampening function receives a message packet with a destination IP address corresponding to a route which has been removed, then the router will drop the message packet. (If the route later "settles down", i.e. does not change much over the next predetermined interval, then the BGP Dampening function will restore the route to its routing table and thereafter forward message packets along this route to the respective destination IP address.)

An object of the present invention is to better control routing decisions.

Another object of the present invention is to reduce the number of dropped packets.

SUMMARY OF THE INVENTION

The present invention resides in a computer system, method and program for making routing decisions. A best routing path according to an OSPF, IGRP, EIGRP, BGP or other routing function that can provide multiple routing paths is determined. A first multiplicity of routers in the best routing path is determined. If each of the first multiplicity of routers had a degree of availability during a predetermined prior interval greater than or equal to a predetermined threshold, the message packet is forwarded to a next hop in the best routing path. If not, a second multiplicity of routers in a second best routing path determined according to said OSPF, IGRP, EIGRP, BGP or the other routing function is identified. If each of the second multiplicity of routers had a degree of availability during a predetermined prior interval greater than or equal to the threshold, the message packet is forwarded to a next hop in the second best routing path.

The present invention also resides in another computer system, method and program for routing a message packet which has been received. A best routing path according to an OSPF, IGRP, EIGRP, BGP or other routing function that can provide multiple routing paths is determined. A first multiplicity of routers in the best routing path is determined. If the first multiplicity of routers had a noise level and/or signal strength during a predetermined prior interval that met respective predetermined thresholds, the message packet is forwarded to a next hop in the best routing path. If not, a second multiplicity routers in a second best routing path determined according to said OSPF, IGRP, EIGRP, BGP or the other routing function is determined. If the second multiplicity of routers had a noise level and/or signal strength during a predetermined prior interval that met respective predetermined thresholds, the message packet is forwarded to a next hop in the second best routing path.

DETAILED DESCRIPTION OF THE PREFERRED EMBODIMENTS

Figure 1:
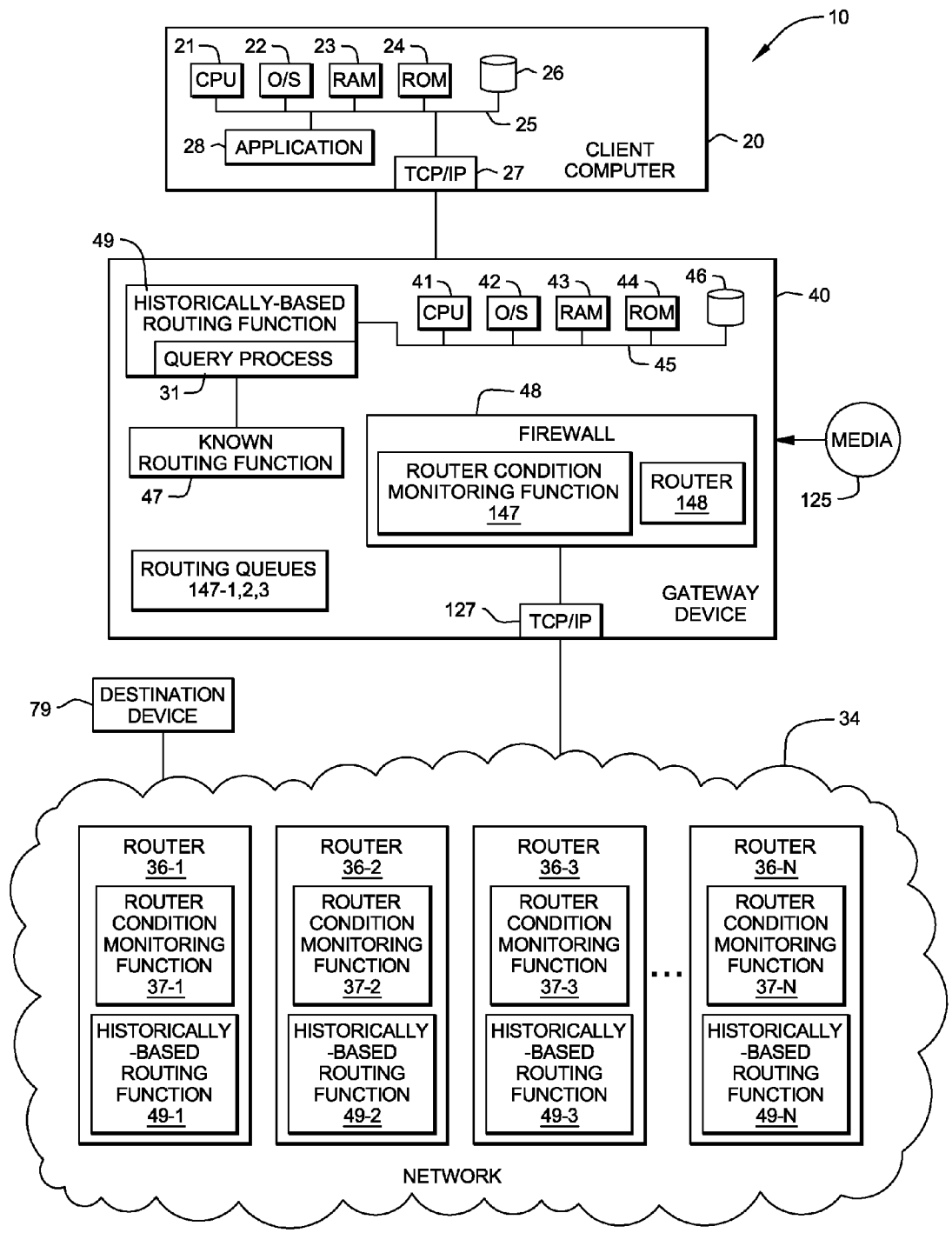
FIG. 1 is a block diagram of a distributed computer system including a network gateway device which embodies the present invention.

The present invention will now be described in detail with reference to the figures. FIG. 1 illustrates a distributed computer system generally designated 10 in which the present invention is embodied. System 10 comprises a client computer 20 and a gateway device 40 to interface to a public or private network 34 (such as the public Internet). Network 34 includes a multiplicity of routers, such as network routers 36-1, 36-2, 36-N, to forward message packets from client computer 20/gateway 40 to a destination device 79 (for example, a destination computer or a gateway device to a subnet of the destination computer), and vice versa. Client computer 20 can be a workstation or server (for example, a web server, production server, etc.) and includes a known CPU 21, operating system 22, RAM 23 and ROM 24 on a common bus 25 and storage 26. Gateway device 40 includes a known CPU 41, operating system 42, RAM 43 and ROM 44 on a common bus 45 and storage 46. Gateway device 40 also includes a known firewall 48. Gateway device 40 also includes a known routing function 47 (embodied in hardware and/or software) such as OSPF, IGRP, EIGRP or BGP routing function. These known routing functions identify and record more than one routing path to most destinations. Other routing functions that identify and record more than one routing path to most destinations can be used as well for routing function 47. In accordance with the present invention, gateway device 40 also includes a historically-based routing function 49, implemented in hardware and/or software, which considers not only shortest path factors (such as determined by a known OSPF, IGRP, EIGRP or BGP routing function 47) but also historical level of availability of routers in the path, and in the case of a wireless router, the quality of connection, i.e. noise level and/or signal strength of the wireless router. Based on all these factors, historically-based routing function 49 selects a routing path as described below.

Routing-condition monitoring functions 37-1, 37-2, 37-3 . . . 37-N (implemented by program and/or hardware) within respective routers 36-1, 36-2, 36-3, 36-N and within a router 148 within firewall 48 track the availability of the respective routers during a prior interval, such as thirty minutes. A router is available when the router is functional and a communication link in the network to the router is available. (If the router is not functional during some period, and later resumes operation, there will be nonvolatile time records within the router which record the down time. The operating system within the router wrote the nonvolatile time records shortly before shut down.) Routing-condition monitoring functions 37-1, 37-2, 37-3 . . . 37-N and 147 within each respective router 36-1, 36-2, 36-3 . . . 36-N and router 148 (within firewall 48) connected wirelessly to a network also track their respective quality of connection, i.e. noise level and signal strength over time, as follows. Each router periodically tracks its noise level by noting the level of noise received by the wireless device's internal radio, and then records the noise level. Each router periodically tracks its signal strength from the wireless device's internal radio, and then records the signal strength. Each router periodically broadcasts to neighboring routers the fact that it is currently available as well as its historical availability and in the case of a wireless router, its historical quality of connection (i.e. noise level and signal strength at increments in time during a predetermined interval). Each router 36-1, 36-2, 36-3 . . . 36-N also includes a respective historically-based routing function 49-1, 49-2, 49-3 . . . 49-N similar to historically-based routing function 49.

In a typical scenario, a known application 28 in client computer 20 generates a message addressed to gateway device 40. A TCP/IP adapter card 27 within client computer 20 packetized the messages according to the OSI model, and forwards the message packets to gateway device 40. Each of the message packets includes a header with a source IP address, a destination IP address, source port number and destination port number. Each of the message packets also includes a payload, separate from the header, containing data. Upon receipt of each message packet at gateway device 40, historically-based routing function 49 queries the known routing function 47 (for example, OSPF, IGRP, ISIS or BGP) to determine the best path to forward the message packet, as determined by the known routing function 47 based on the routing policy of the known routing function 47. The OSPF protocol attempts to route message packets to a destination via the shortest path, i.e. fewest number of intervening routers or "hops". The IGRP protocol attempts to route message packets based on greatest bandwidth, shortest delays and shortest path factors. The BGP protocol attempts to route message packets based on shortest Autonomous System path (i.e. fewest number of routers within a single administrative control), and least multi-exit discriminator ("MED") (i.e. a preference for one route over another that is advertised to neighboring routers, etc.). Next, historically-based routing function 49 determines if this path includes any routers whose historical availability and/or historical quality of connection does not meet an applicable threshold for historic availability and/or quality of connection. If all the routers in the path meet the applicable threshold for historic availability and/or quality of connection, then the router forwards the message packet to the next hop in the path. However, if any of the routers in the path does not meet the applicable threshold for historic availability and/or quality of connection, historically-based routing function 49 queries the known routing function 47 for the second best path to forward the message packet, as determined by the known routing function 47. Next, historically-based routing function 49 determines if this second best path (based on the routing policy of the known routing function 47) includes any routers whose historical availability or historical quality of connection does not meet an applicable threshold. If so, historically-based routing function 49 queries the known routing function 47 for the third best path to forward the message packet (as determined by the known routing function 47). The foregoing process is performed (and repeated if necessary) until a routing path is identified that has sufficient historical availability and in the case of wireless router, sufficient quality of connection.

Figure 2:
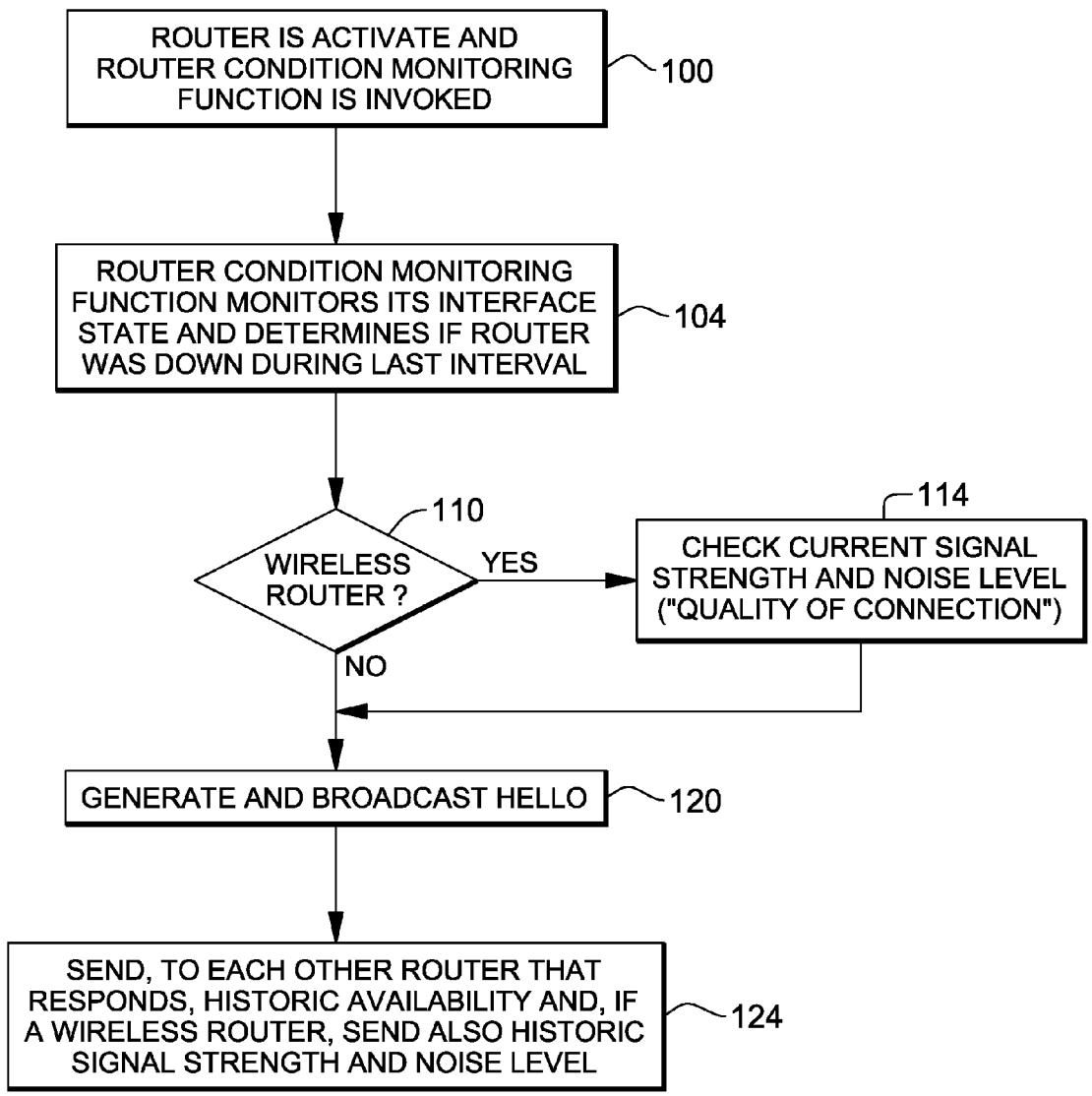
FIG. 2 is a flow chart of a historically-based routing function, implemented in hardware and/or software, within any of the routers of FIG. 1 while it collects and broadcasts its historical availability and in the case of a wireless router, its historical quality of connection.

FIG. 2 illustrates function and operation of each router 36-1, 36-2, 36-3 . . . 36-N and 148 while it collects and broadcasts its historical availability and in the case of a wireless router, its historical quality of connection. In step 100, a router such as router 36-1 is active. (The other routers function similarly.) Next, router condition monitoring function 37-1 monitors its interface state (step 104). The interface state comprises the availability of a network communication path from the local router to the physical communication medium. Function 37-1 monitors its interface state by detecting changes to the physical communication medium and the OSI data link layer. Router 36-1 performs this monitoring periodically. In step 104, function 37-1 also determines from time records entered by an operating system within router 36-1 if router 36-1 was down during the last period for monitoring. If router 36-1 is a wireless router (decision 110, yes branch), then function 37-1 also checks its current signal strength and noise level (step 114). Next, router 36-1 generates a "hello" advertisement and broadcasts to routing devices to which the wireless router is associated (step 120). For each neighboring router that responds (decision 122, yes branch), function 37-1 sends its historical availability record during the last predetermined interval, and if router 36-1 is a wireless router, its historical quality of connection record during the last predetermined interval (step 124). (If a neighboring router does not respond to the "hello" broadcast by router 36-1, then function 37-1 does not send its historical availability record or quality of connection.)

Figure 3:
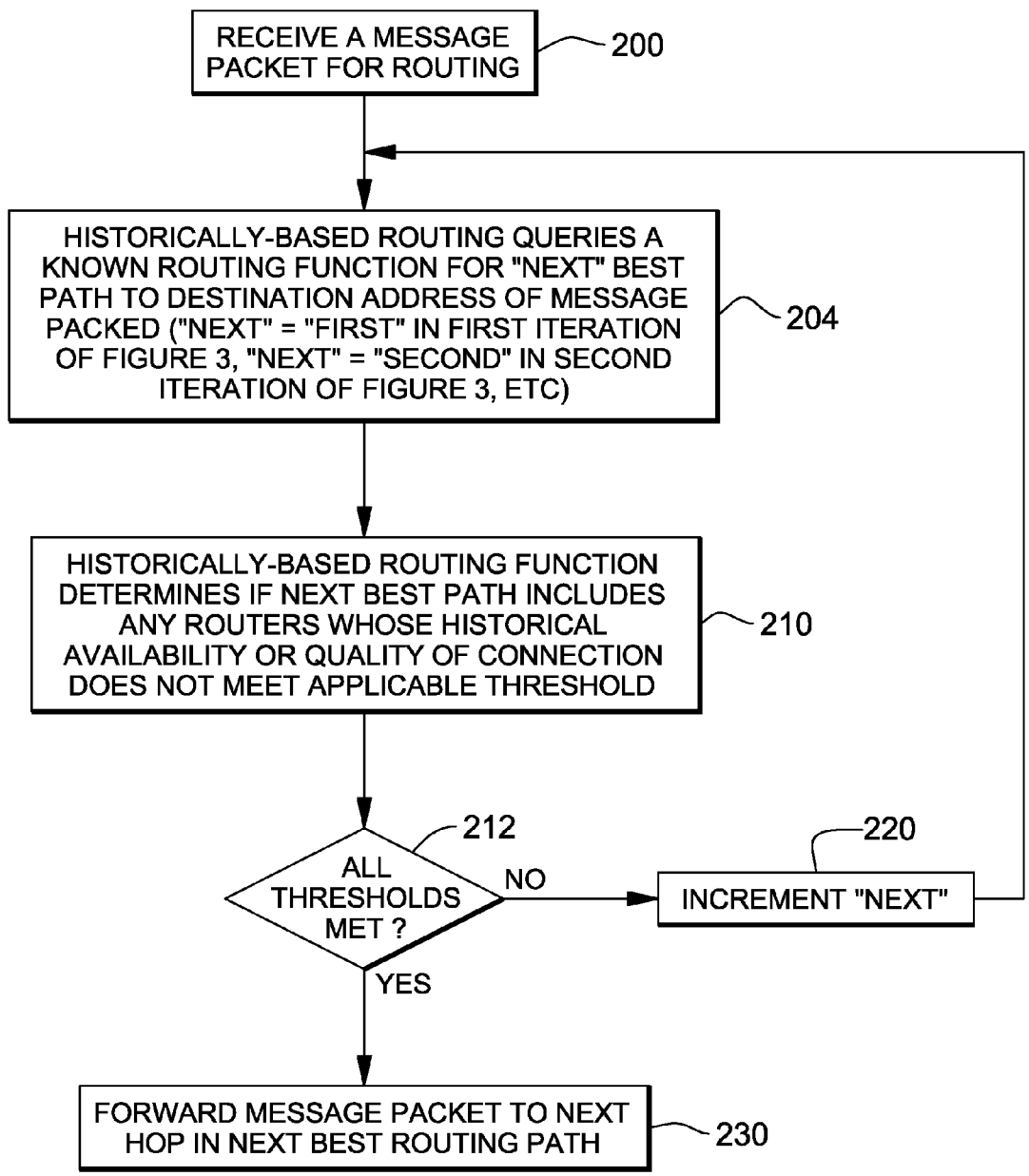
FIG. 3 is a flow chart of a historically-based routing function, implemented in hardware and/or software, within any of the routers of FIG. 1 when it determines a routing path for a message packet which is received.

FIG. 3 illustrates function and operation of each router 36-1, 36-2, 36-3 . . . 36-N and 148 when it determines a routing path for a message packet which is received. For purposes of explanation, assume that router 36-1 forwards a message packet to router 36-2. In step 200, router 36-2 receives a message packet for routing. The message packet header identifies the destination IP address. In response, historically-based routing function 49-2 (which is similar to function 49 in gateway 40) in router 36-2 queries known routing function 37-2 (which is similar to known routing function 37 in gateway 40) in router 36-2 for the best path to this destination IP address based on the known routing algorithm (step 204). (In this first iteration of FIG. 3, "next" is the "first".) Next, historically-based routing function 49-2 determines if this path includes any routers whose historical availability or historical quality of connection does not meet an applicable threshold (step 210). For example, the threshold for historical availability can be greater than or equal to 95%. In the case of wireless router, the threshold for noise level can be less than or equal to 85 dbm, and the threshold for signal strength can be greater than or equal to 95 dbm. Other thresholds can be used as well. (In one alternate embodiment of the present invention, only the wireless routers in the path are considered and only the noise level and signal strength for the wireless router are considered, not their historical availability. In this one alternate embodiment, if the noise level and signal strength are outside the applicable threshold, then function 49-2 does not select the path containing the wireless router. In a second alternate embodiment of the present invention, all routers in the path are considered and but only their historical availability is considered. In this second alternate embodiment, if the historic availability is outside the applicable threshold, then function 49-2 does not select the path containing the router whose historic availability is outside the applicable threshold.) If all of the routers in the best path meet the applicable thresholds for historic availability and quality of connection (decision 212 yes branch), then router 36-2 forwards the packet to the next hop in this best path (step 230). However, if any of the applicable thresholds in the best path determined by the known routing function 47-2 are not met (decision 212, no branch), then historically-based routing function 49-2 queries the known routing function 47-2 for the second best path to forward the message packet, as determined by the known routing function 47-2 (step 204 where "next" equals "second"). Next, historically-based routing function 49-2 determines if this second best path includes any routers whose historical availability or historical quality of connection does not meet an applicable threshold (step 210). If all of the routers in the second best path meet the applicable thresholds for historic availability and quality of connection (decision 212 yes branch), then router 36-2 forwards the packet to the next hop in the second best path (step 230). However, if any of the applicable thresholds in the second best path determined by the known routing function 47-2 are not met (decision 212, no branch), then historically-based routing function 49-2 queries the known routing function 47-2 for the third best path to forward the message packet, as determined by the known routing function 47-2 (step 220 and step 204). The foregoing process is repeated until function 49-2 identifies a routing path that has sufficient historical availability and in the case of wireless router, sufficient quality of connection (decision 212, yes branch). After function 49-2 identifies the proper routing path to follow toward the destination IP address specified in the packet header, router 36-2 forwards the message packet to the next hop router in this path (step 230). The next hop router then performs the foregoing steps 200-230.

In one alternate embodiment of the present invention, only the wireless routers in the path are considered and only the noise level and signal strength for the wireless router are considered, not their historical availability. In this one alternate embodiment, if the noise level and signal strength are outside the applicable threshold, then function 49-2 does not select the path containing the wireless router. In a second alternate embodiment of the present invention, all routers in the path are considered but only their historical availability is considered. In this second alternate embodiment, if the historic availability in a path is outside the applicable threshold, then function 49-2 does not select the path containing the router whose historic availability is outside the applicable threshold.

To the extent historically-based routing functions 49, 49-1, 49-2, 49-3 . . . 49-N are implemented in software, they can be loaded into their respective gateway or router from a computer readable media such as media 125, where the computer readable media can be magnetic tape or disk, optical media, DVD, memory stick, semiconductor memory, etc. or downloaded form the Internet via a respective TCP/IP adapter card 127.

To the extent known routing functions 47, 47-1, 47-2, 47-3 . . . 47-N and 147 are implemented in software, they can be loaded into their respective gateway or router from a computer readable media such as media 125, where the computer readable media can be magnetic tape or disk, optical media, DVD, memory stick, semiconductor memory, etc. or downloaded form the Internet via a respective TCP/IP adapter card 127.

Based on the foregoing, a computer system, method and program product for routing have been disclosed. However, numerous modifications and substitutions can be made without deviating from the scope of the present invention. Therefore, the present invention has been disclosed by way of illustration and not limitation, and reference should be made to the following claims to determine the scope of the present invention.

What is claimed is:

1. A method for routing a message packet which has been received, the method comprising the steps of:
   a computer determining a best routing path according to an Open Shorted Path First (OSPF), Interior Gateway Routing Protocol (IGRP), Enhanced Interior Gateway Routing Protocol (EIGRP), Border Gateway Protocol (BGP) or other routing function;
   the computer identifying a first multiplicity of routers in the best routing path, and determining if all routers of the first multiplicity of routers had, at increments in time during a predetermined prior time interval, respective signal strengths that exceeded a predetermined threshold;
   if so, the computer forwarding the message packet to a next hop in the best routing path, and
   if not, the computer identifying a second multiplicity of routers in a second best routing path determined according to the OSPF, IGRP, EIGRP, BGP or the other routing function, and the computer determining if all routers of the second multiplicity of routers had, during a predetermined prior interval, signal strengths that exceeded the predetermined threshold, and if so, forwarding the message packet to a next hop in the second best routing path.

2. A method for routing a message packet which has been received, said method comprising:
a first router, after having received the message packet, determining a next best routing path comprising a next set of routers comprising a first set of routers for routing the message packet from the first router to a destination address;
said first router ascertaining whether the next set of routers satisfies at least one criterion comprising a first criterion, said first criterion is that each router of the next set of routers had a percent availability at or above a specified percent availability threshold over a specified time interval;
if said ascertaining ascertains that the next set of routers satisfies the at least one criterion, said first router forwarding the message packet to a next hop in the next best routing path;
if said ascertaining ascertains that the next set of routers does not satisfy the at least one criterion: said first router determining another best routing path comprising another set of routers for routing the message packet to the destination address; said first router setting said next best routing path and said next set of routers to said another best routing path and said another set of routers, respectively; and after said setting, said first router iteratively looping back to said ascertaining whether the next set of routers satisfies at least one criterion, until said forwarding the message packet is performed.

3. The method of claim 2, wherein the at least one criterion comprises a second criterion, said second criterion is that each router of the next set of routers has received a signal having a magnitude of signal strength at or above a specified signal strength threshold at increments in time during the specified time interval.

4. The method of claim 2, wherein the at least one criterion comprises a second criterion, said second criterion is that each router of the next set of routers has received a signal having a magnitude of noise level at or below a specified noise level threshold at increments in time during the specified time interval.

5. The method of claim 2, wherein for the next set of routers comprising the first set of routers, said ascertaining ascertains that the next set of routers satisfy the at least one criterion.

6. The method of claim 2, said method further comprising:
said first router broadcasting a HELLO advertisement to each neighbor router of a plurality of neighbor routers of the first router;
said first router receiving a response to the broadcasted HELLO advertisement from one or more neighbor routers of the plurality of neighbor routers;
said first router not receiving any response to the broadcasted HELLO advertisement from at least one neighbor router of the plurality of neighbor routers;
said first router sending, to each neighbor router responding to the broadcasted HELLO advertisement, a historical availability record of the first router and a historical quality of connection record of the first router;
said first router not sending, to each neighbor router not responding to the broadcasted HELLO advertisement, the historical availability record of the first router and the historical quality of connection record of the first router;

wherein the historical availability record of the first router includes a percent availability of the first router during a specified time period; and
wherein the historical quality of connection record of the first router includes a signal strength of signals received by the first router during the specified time period and a level of noise at the first router during the specified time period.

7. A computer program product for routing a message packet which has been received, said computer program product comprising:
a computer readable tangible storage device;
first software for execution in a first router, after having received the message packet, for determining a next best routing path comprising a next set of routers comprising a first set of routers of for routing the message packet from the first router to a destination address;
second software for execution in said first router ascertaining whether the next set of routers satisfies at least one criterion comprising a first criterion, said first criterion is that each router of the next set of routers had a percent availability at or above a specified percent availability threshold over a specified time interval
third software for execution in said first router, and responsive to said second software ascertaining that the next set of routers satisfies the at least one criterion, said first router forwarding the message packet to a next hop in the next best routing path;
fourth software for execution in said first router, and responsive to said second software ascertaining that the next set of routers does not satisfy the at least one criterion: said first router determining another best routing path comprising another set of routers for routing the message packet to the destination address; said first router setting said next best routing path and said next set of routers to said another best routing path and said another set of routers, respectively; and after said setting, said first router iteratively looping back to said ascertaining whether the next set of routers satisfies at least one criterion, until said forwarding the message packet is performed,
wherein the first software, the second software, the third software, and the fourth software are stored on the computer readable tangible storage device.

8. The computer program product of claim 7, wherein the at least one criterion comprises a second criterion, said second criterion is that each router of the next set of routers has received a signal having a magnitude of signal strength at or above a specified signal strength threshold at increments in time during the specified time interval.

9. The computer program product of claim 7, wherein the at least one criterion comprises a second criterion, said second criterion is that each router of the next set of routers has received a signal a signal having a magnitude of noise level at or below a specified noise level threshold at increments in time during the specified time interval.

10. The computer program product of claim 7, wherein for the next set of routers comprising the first set of routers, said ascertaining ascertains that the next set of routers satisfy the at least one criterion.

11. The computer program product of claim 7, said computer program product further comprising fifth software for:
said first router broadcasting a HELLO advertisement to each neighbor router of a plurality of neighbor routers of the first router;

said first router receiving a response to the broadcasted HELLO advertisement from one or more neighbor routers of the plurality of neighbor routers;

said first router not receiving any response to the broadcasted HELLO advertisement from at least one neighbor router of the plurality of neighbor routers;

said first router sending, to each neighbor router responding to the broadcasted HELLO advertisement, a historical availability record of the first router and a historical quality of connection record of the first router;

said first router not sending, to each neighbor router not responding to the broadcasted HELLO advertisement, the historical availability record of the first router and the historical quality of connection record of the first router;

wherein the historical availability record of the first router includes a percent availability of the first router during a specified time period; and wherein the historical quality of connection record of the first router includes a signal strength of signals received by the first router during the specified time period and a level of noise at the first router during the specified time period, wherein the fifth software is stored on the computer readable storage medium for execution in the first router.

12. A system for routing a message packet which has been received, said system comprising:

a first router including a CPU, a computer-readable memory and a computer readable tangible storage device;

first software for execution in said first router, after having received the message packet, determining a next best routing path comprising a next set of routers comprising a first set of routers of for routing the message packet from the first router to a destination address;

second software for execution in said first router ascertaining whether the next set of routers satisfies at least one criterion comprising a first criterion, said first criterion is that each router of the next set of routers had a percent availability at or above a specified percent availability threshold over a specified time interval;

third software for execution in said first router, and responsive to said second software ascertaining ascertains that the next set of routers satisfies the at least one criterion, said first router forwarding the message packet to a next hop in the next best routing path;

fourth software for execution in said first router, and responsive to said second software ascertaining ascertains that the next set of routers does not satisfy the at least one criterion: said first router determining another best routing path comprising another set of routers for routing the message packet to the destination address; said first router setting said next best routing path and said next set of routers to said another best routing path and said another set of routers, respectively; and after said setting, said first router iteratively looping back to said ascertaining whether the next set of routers satisfies at least one criterion, until said forwarding the message packet is performed, wherein the first software, the second software, the third software, and the fourth software are stored on the computer readable tangible storage device for execution by the CPU via the computer-readable memory in the first router.

13. The system of claim 12, wherein the at least one criterion comprises a second criterion, said second criterion is that each router of the next set of routers has received a signal having a magnitude of signal strength at or above a specified signal strength threshold at increments in time during the specified time interval.

14. The system of claim 12, wherein the at least one criterion comprises a second criterion, said second criterion is that each router of the next set of routers has received a signal having a magnitude of noise level at or below a specified noise level threshold at increments in time during the specified time interval.

15. The system of claim 12, wherein for the next set of routers comprising the first set of routers, said ascertaining ascertains that the next set of routers satisfy the at least one criterion.

16. The system of claim 12, said system further comprising fifth software for:

said first router broadcasting a HELLO advertisement to each neighbor router of a plurality of neighbor routers of the first router;

said first router receiving a response to the broadcasted HELLO advertisement from one or more neighbor routers of the plurality of neighbor routers;

said first router not receiving any response to the broadcasted HELLO advertisement from at least one neighbor router of the plurality of neighbor routers;

said first router sending, to each neighbor router responding to the broadcasted HELLO advertisement, a historical availability record of the first router and a historical quality of connection record of the first router;

said first router not sending, to each neighbor router not responding to the broadcasted HELLO advertisement, the historical availability record of the first router and the historical quality of connection record of the first router;

wherein the historical availability record of the first router includes a percent availability of the first router during a specified time period;

wherein the historical quality of connection record of the first router includes a signal strength of signals received by the first router during the specified time period and a level of noise at the first router during the specified time period, wherein the fifth software is stored on the computer readable storage medium for execution in the first router.

17. The method of claim 1, wherein said determining comprises determining that said all routers had, during the predetermined prior interval, signal strengths that exceeded the predetermined threshold.

* * * * *